(12) United States Patent
Smith et al.

(10) Patent No.: US 11,825,408 B2
(45) Date of Patent: Nov. 21, 2023

(54) MULTI-WIRELESS ACCESS SYSTEMS AND METHODS FOR EFFICIENT LINK SELECTION AND AGGREGATION

(71) Applicant: Cisco Technology, Inc., San Jose, CA (US)

(72) Inventors: Malcolm Muir Smith, Richardson, TX (US); Jerome Henry, Pittsboro, NC (US); John George Apostolopoulos, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/663,927

(22) Filed: May 18, 2022

(65) Prior Publication Data

US 2022/0279433 A1    Sep. 1, 2022

Related U.S. Application Data

(63) Continuation of application No. 16/715,211, filed on Dec. 16, 2019, now Pat. No. 11,368,906.

(51) Int. Cl.
| | |
|---|---|
| *H04W 48/18* | (2009.01) |
| *H04W 64/00* | (2009.01) |
| *H04W 72/04* | (2023.01) |
| *H04W 84/04* | (2009.01) |
| *H04W 84/12* | (2009.01) |
| *H04W 88/06* | (2009.01) |

(52) U.S. Cl.
CPC ........... *H04W 48/18* (2013.01); *H04W 64/00* (2013.01); *H04W 72/04* (2013.01); *H04W 84/042* (2013.01); *H04W 84/12* (2013.01); *H04W 88/06* (2013.01)

(58) Field of Classification Search
CPC ..... H04W 64/00; H04W 4/025; H04W 4/029; H04W 88/005; H04W 36/0079; H04W 36/14; H04W 36/30; H04W 36/36; H04W 88/06
USPC ..... 455/437, 456.1; 370/329, 252, 311, 331, 370/330, 241, 328, 352
See application file for complete search history.

(56) References Cited

U.S. PATENT DOCUMENTS

| | | |
|---|---|---|
| 10,579,218 B2 | 3/2020 | Lee et al. |
| 10,582,550 B2 | 3/2020 | Banks et al. |
| 10,638,361 B2 | 4/2020 | Gunasekara et al. |
| 10,650,621 B1 | 5/2020 | King et al. |

(Continued)

*Primary Examiner* — Joseph Arevalo
(74) *Attorney, Agent, or Firm* — Polsinelli

(57) ABSTRACT

Systems, methods, and computer-readable media for controlling link selection and aggregation across multiple wireless networks based on a location of a mobile device. A location of a mobile device in a physical environment can be identified. At least portions of the physical environment can be in wireless range of a first wireless network and a second wireless network. Whether to access network services through either or both the first wireless network and the second wireless network can be determined based on the location of the mobile device in the physical environment. Further, a first interface at the mobile device to the first wireless network and a second interface at the mobile device to the second wireless network can be selectively toggled according to whether it is determined to access the network services through either or both the first wireless network and the second wireless network based on the location.

20 Claims, 8 Drawing Sheets

(56) References Cited

U.S. PATENT DOCUMENTS

| | | | |
|---|---|---|---|
| 10,701,681 B1 | 6/2020 | Tofighbakhsh et al. | |
| 11,038,774 B2 | 6/2021 | Lagares-Greenblatt et al. | |
| 11,483,877 B2* | 10/2022 | Ravishankar | H04W 76/10 |
| 2010/0103829 A1 | 4/2010 | Murzeau et al. | |
| 2012/0201143 A1 | 8/2012 | Schmidt et al. | |
| 2013/0260732 A1* | 10/2013 | Singh | H04W 52/0254 |
| | | | 455/418 |
| 2014/0274009 A1 | 9/2014 | Do et al. | |
| 2017/0238244 A1 | 8/2017 | Padden et al. | |
| 2017/0325055 A1* | 11/2017 | Enomoto | H04W 76/22 |
| 2018/0206188 A1* | 7/2018 | Nam | H04W 48/18 |
| 2018/0270741 A1* | 9/2018 | Enomoto | H04W 76/12 |
| 2019/0037418 A1 | 1/2019 | Gunasekara et al. | |
| 2019/0042854 A1 | 2/2019 | Sanjay et al. | |
| 2019/0121417 A1* | 4/2019 | Schneider | H04W 52/0229 |
| 2019/0191483 A1* | 6/2019 | Ryoo | H04W 12/0433 |
| 2019/0373301 A1 | 12/2019 | Gunasekara et al. | |
| 2020/0037387 A1* | 1/2020 | Lee | H04W 36/0069 |
| 2020/0382361 A1* | 12/2020 | Chandrasekhar | G06N 5/003 |
| 2020/0401416 A1* | 12/2020 | Zhu | G06F 3/017 |
| 2021/0105738 A1* | 4/2021 | Bendlin | H04W 8/183 |
| 2021/0153081 A1* | 5/2021 | Li | H04W 48/16 |
| 2021/0204349 A1* | 7/2021 | Jin | H04W 48/16 |
| 2021/0298112 A1* | 9/2021 | Chen | H04W 8/02 |
| 2022/0038925 A1* | 2/2022 | Agarwal | H04W 76/10 |
| 2022/0053426 A1* | 2/2022 | Ahn | H04W 76/16 |
| 2022/0078877 A1* | 3/2022 | Lee | H04W 76/27 |
| 2022/0109496 A1* | 4/2022 | Shrestha | H04B 7/18519 |

* cited by examiner

MULTI-WIRELESS ACCESS SYSTEMS AND METHODS FOR EFFICIENT LINK SELECTION AND AGGREGATION

CROSS-REFERENCES TO RELATED APPLICATIONS

This application is a continuation of U.S. application Ser. No. 16/715,211, filed on Dec. 16, 2019, which is hereby incorporated by reference, in its entirety and for all purposes.

TECHNICAL FIELD

The present technology pertains to controlling link selection and aggregation across multiple wireless networks based on a location of a mobile device.

BACKGROUND

Current mobile devices, otherwise referred to as user equipment (UE) or a station (STA), typically support at least two wireless interfaces to different wireless networks. For example, current mobile devices typically have a wireless interface to a cellular network, e.g. Long Term Evolution (LTE) network, and a wireless interface to an enterprise wireless network, e.g. WiFi network. In turn, the mobile devices can access network services through either or both of the cellular network and the enterprise wireless network using the corresponding network interfaces. However, providing capabilities to access network services through multiple networks can create problems with respect to link selection and aggregation across the networks.

Specifically, as cellular networks and enterprise wireless networks are typically maintained by separate entities, problems with respect to link selection and aggregation across the networks can arise. In particular, operators of different wireless networks can implement conflicting techniques for performing link selection and aggregation across the networks. For example, cellular operators have attempted to deploy 3GPP's Heterogeneous Network (HetNet) approaches to control link selection and aggregation. In HetNet approaches, enterprise wireless network, e.g. WiFi network, link selection and aggregation is controlled by a cellular operator via the access network discovery & selection function (ANDSF). However, this policy is not congruent with the policies of enterprise wireless network/WiFi operators who typically prefer to provide wireless network service access through the enterprise network because of the enhanced security it provides. Specifically, HetNet approaches treat both enterprise wireless networks and cellular networks as equally viable, e.g. using radio-level key performance indicators (KPIs) to ultimately select the network, in contrast to the policies of WiFi operators which prefer WiFi as the network of choice. On the WiFi operator side, Multiband Operations (MBO) has been proposed as a way for a station/mobile device to advertise its cellular modem availability for cellular network access. However, MBO does not address the link selection process across both cellular and WiFi networks, e.g. no preference is presumed between the networks.

Further, providing separate interfaces to a plurality of wireless networks can increase both power demands at mobile devices and resource usage, e.g. air-time usage, by the mobile devices across the networks. Specifically, HetNet, MBO, and most other arbitration and load-balancing techniques require that both interfaces be in an operational state, thereby consuming large amounts of power & air-time. In particular, HetNet requires that both WiFi network and cellular network control capabilities, and corresponding network interfaces, are activated to estimate access quality for purposes of either switching between the active interfaces or using both of the interfaces to access network services. However, this increases power consumption at the mobile devices and resource, e.g. air-time, usage by the mobile devices.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
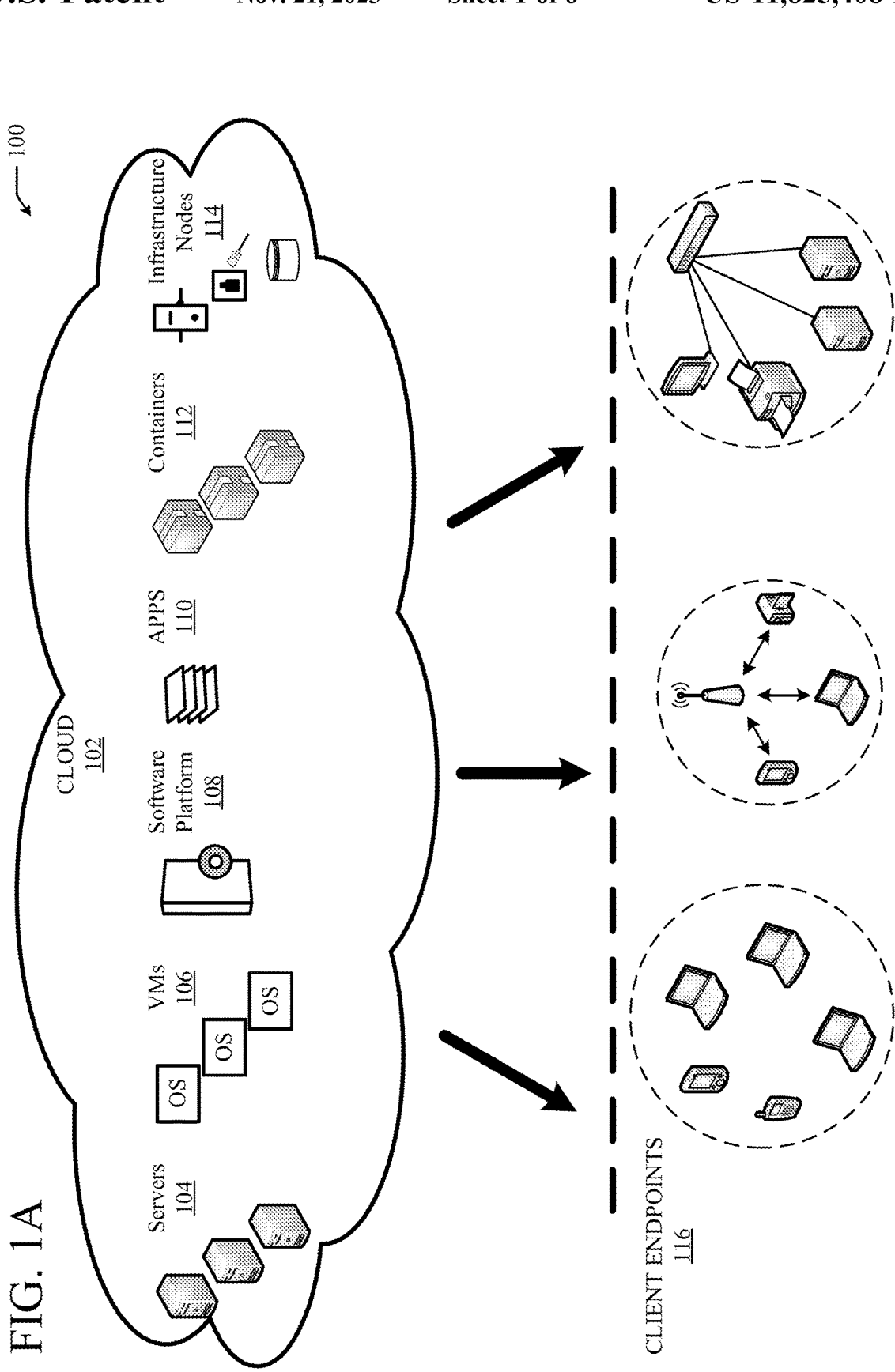
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include identifying a location of a mobile device in a physical environment. At least a first portion of the physical environment can be in wireless range of a first wireless network and at least a second portion of the physical environment can be in wireless range of a second wireless network. The method can also include determining whether to access network services through either or both the first wireless network and the second wireless network based on the location of the mobile device in the physical environment. Further, a first interface at the mobile device to the first wireless network and a second interface at the mobile device to the second wireless network can be selectively toggled to provide access to the network services through either or both the first wireless network and the second wireless network. Specifically, the first interface and the second interface can be selectively toggled according to whether it is determined to access the network services through either or both the first wireless network and the second wireless network based on the location of the mobile device in the physical environment.

A system can include one or more processors and at least one computer-readable storage medium storing instructions which, when executed by the one or more processors, cause the one or more processors to identify a location of a mobile device in a physical environment. Both a first wireless network and a second wireless network can provide overlapping wireless coverage in at least a portion of the physical environment. The instructions can also cause the one or more processors to determine whether to access network services through either or both the first wireless network and the second wireless network based on the location of the mobile device in the physical environment. Further, the instructions can cause the one or more processors to selectively toggle a first interface at the mobile device to the first wireless network and a second interface at the mobile device to the second wireless network to provide access to the network services through either or both the first wireless network and the second wireless network. Specifically, the instructions can cause the one or more processors to selectively toggle the first interface and the second interface according to whether it is determined to access the network services through either or both the first wireless network and the second wireless network based on the location of the mobile device in the physical environment.

A non-transitory computer-readable storage medium having stored therein instructions which, when executed by a processor, cause the processor to identify a location of a mobile device in a physical environment. At least a first portion of the physical environment can be in wireless range of a WiFi network and at least a second portion of the physical environment can be in wireless range of a cellular network. The instructions can also cause the processor to determine whether to access network services through either or both the WiFi network and the cellular network based on the location of the mobile device in the physical environment. Further, the instructions can cause the processor to selectively toggle a first interface at the mobile device to the WiFi network and a second interface at the mobile device to the cellular network to provide access to the network services through either or both the WiFi network and the cellular network. Specifically, the instructions can cause the processor to selectively toggle the first interface and the second interface according to whether it is determined to access the network services through either or both the WiFi network and the cellular network based on the location of the mobile device in the physical environment.

DESCRIPTION

The disclosed technology addresses the need in the art for effectively controlling link selection and aggregation across multiple wireless networks. In particular, the disclosed technology addresses the need in the art for resolving conflicting policies between cellular operators and enterprise network operators with respect to link selection and aggregation across cellular and enterprise wireless networks. Further, the disclosed technology addresses the need in the art for performing link selection and aggregation across cellular and enterprise wireless networks while decreasing power and resource consumption by mobile devices. The present technology involves system, methods, and computer-readable media for controlling link selection and aggregation across multiple wireless networks based on a location of a mobile device. In particular, the present technology involves systems, methods, and computer-readable media for toggling interfaces at a mobile device to a first wireless network and a second wireless network based on whether it is determined to provide network service access through either or both the first wireless network and the second wireless network according to the location of the mobile device.

Figure 4:
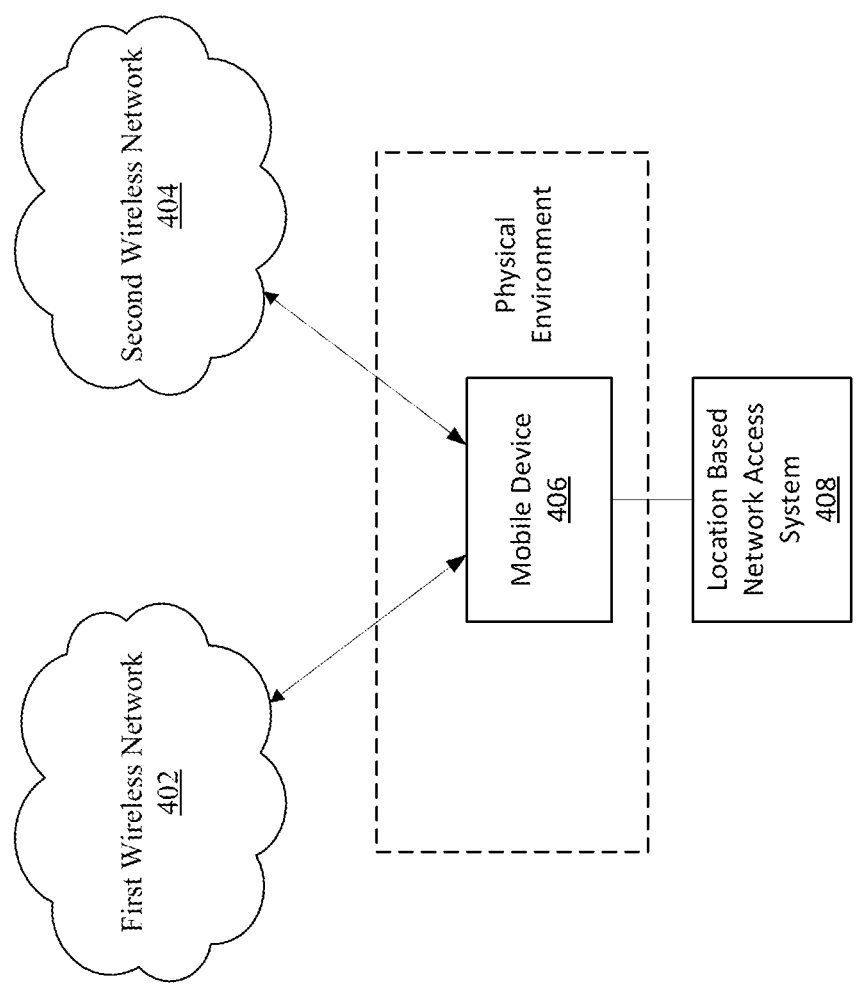
FIG. 4 illustrates an example network environment for controlling link selection and aggregation across multiple wireless networks based on mobile device location.
Figure 5:
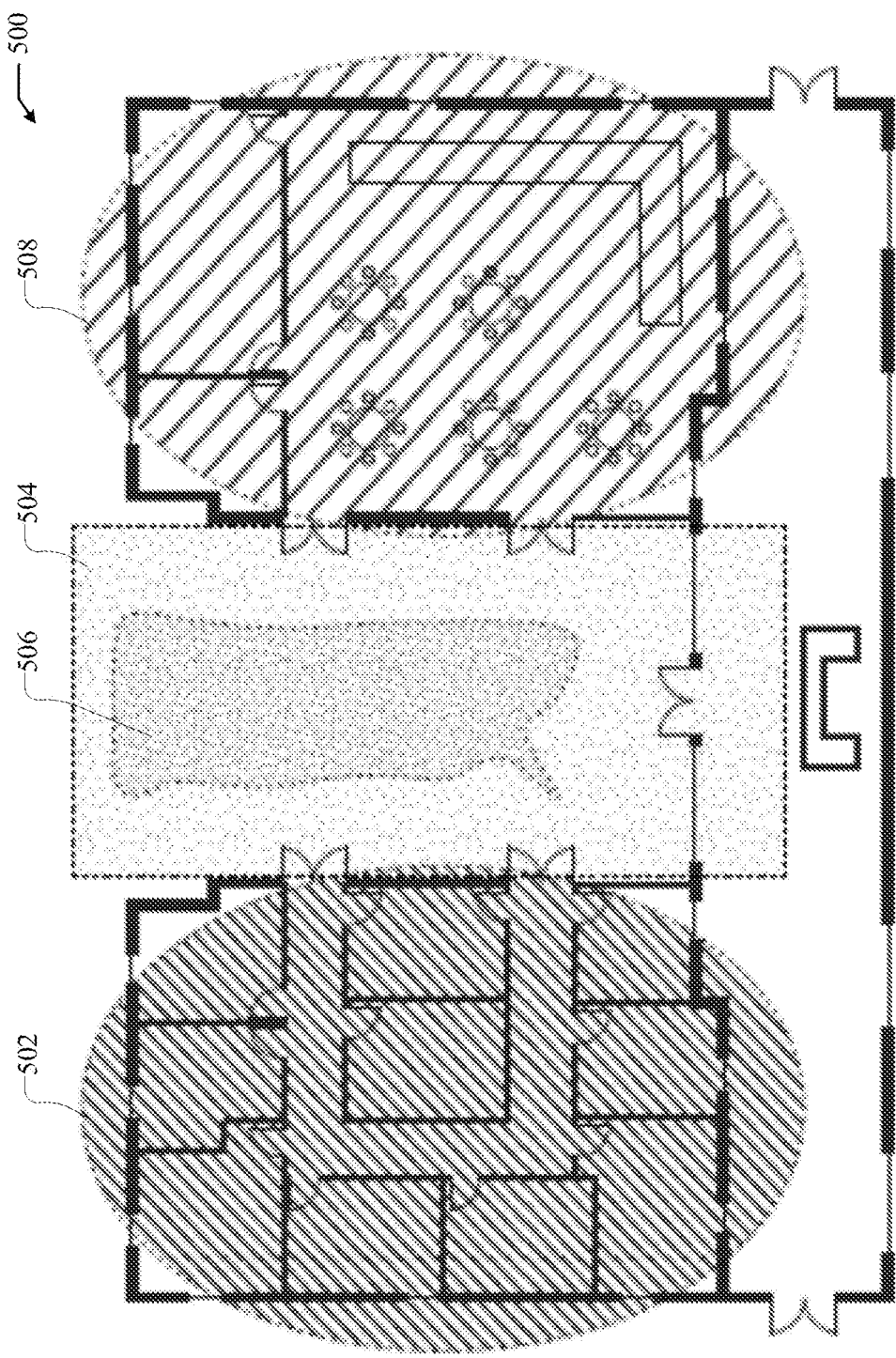
FIG. 5 shows an example of a physical environment with wireless coverage to two wireless networks.
Figure 6:
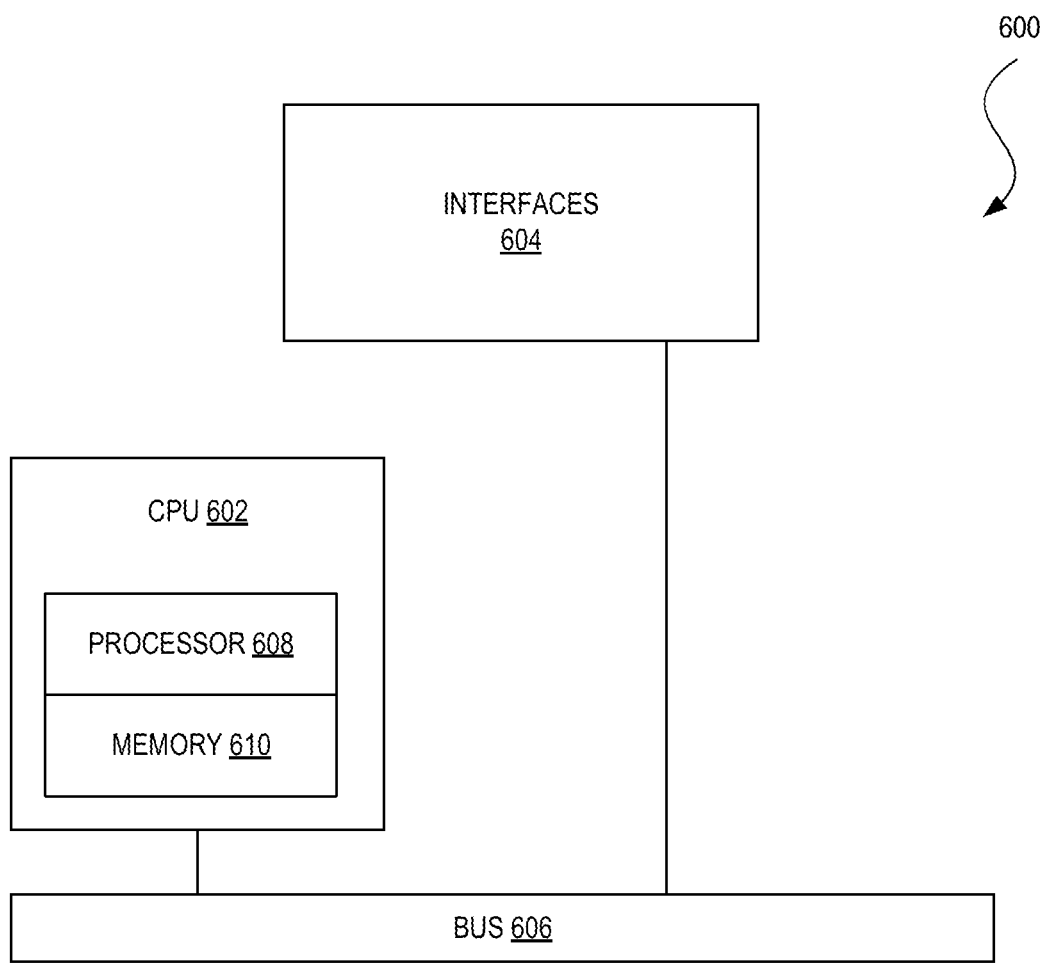
FIG. 6 illustrates an example networking device.
Figure 7:
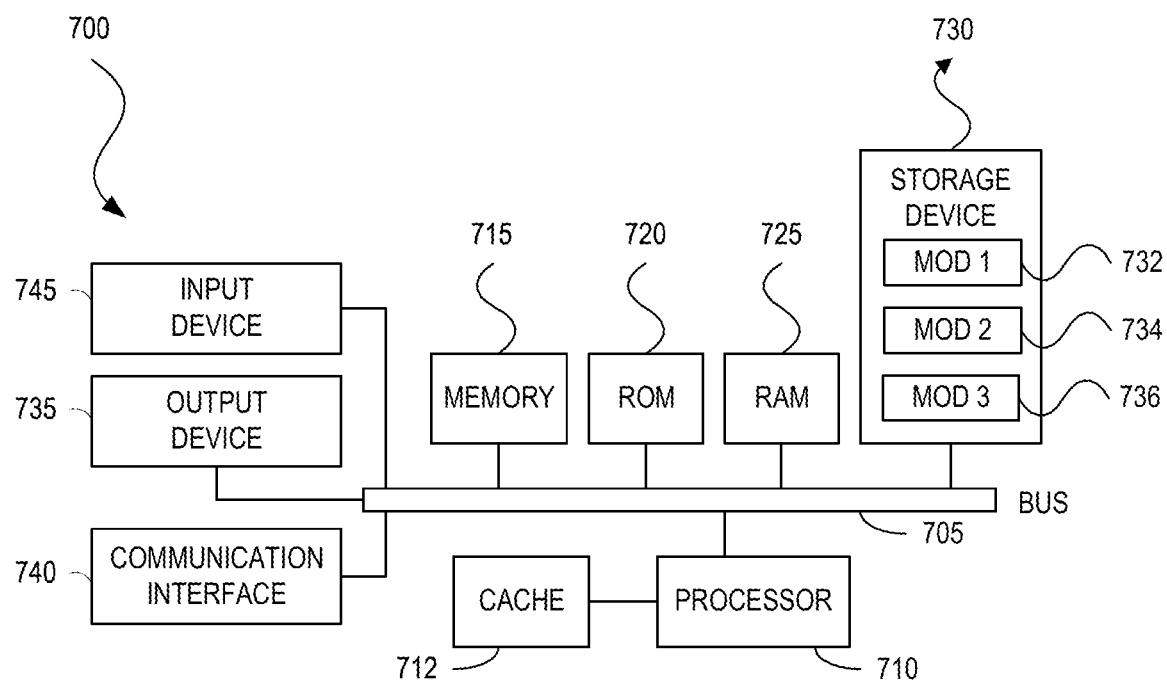
FIG. 7 illustrates an example computing system.

A description of network environments and architectures for network data access and services, as illustrated in FIGS. 1A-3 is first disclosed herein. A discussion of systems, methods, and computer readable media for controlling link selection and aggregation across multiple wireless networks based on a location of a mobile device, as shown in FIGS. 4 and 5, will then follow. The discussion then concludes with a brief description of example devices, as illustrated in FIGS. 6 and 7. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

The client endpoints 116 can communicate with the elements 104-114 as part of accessing network services through infrastructure intermediation messaging. Specifically, communications between the elements 104-114 and the client endpoints 116 can be managed and otherwise controlled through a network infrastructure between the client endpoints 116 and the cloud 102. For example, either or both an LTE infrastructure and a WiFi infrastructure can communicate a physical location of a client endpoint to a cloud service. In turn, the cloud service can cause the infrastructure to send specific signaling to the client endpoint for accessing network services through the cloud service. For example, the cloud service can use the LTE infrastructure, e.g. through an LTE S14 interface, to alert the client endpoint of WiFi availability through the WiFi infrastructure. In another example, the cloud service can use the WiFi infrastructure, e.g. through MBO WiFi messaging, to alert the client endpoint of LTE availability through the LTE infrastructure.

Figure 1B:
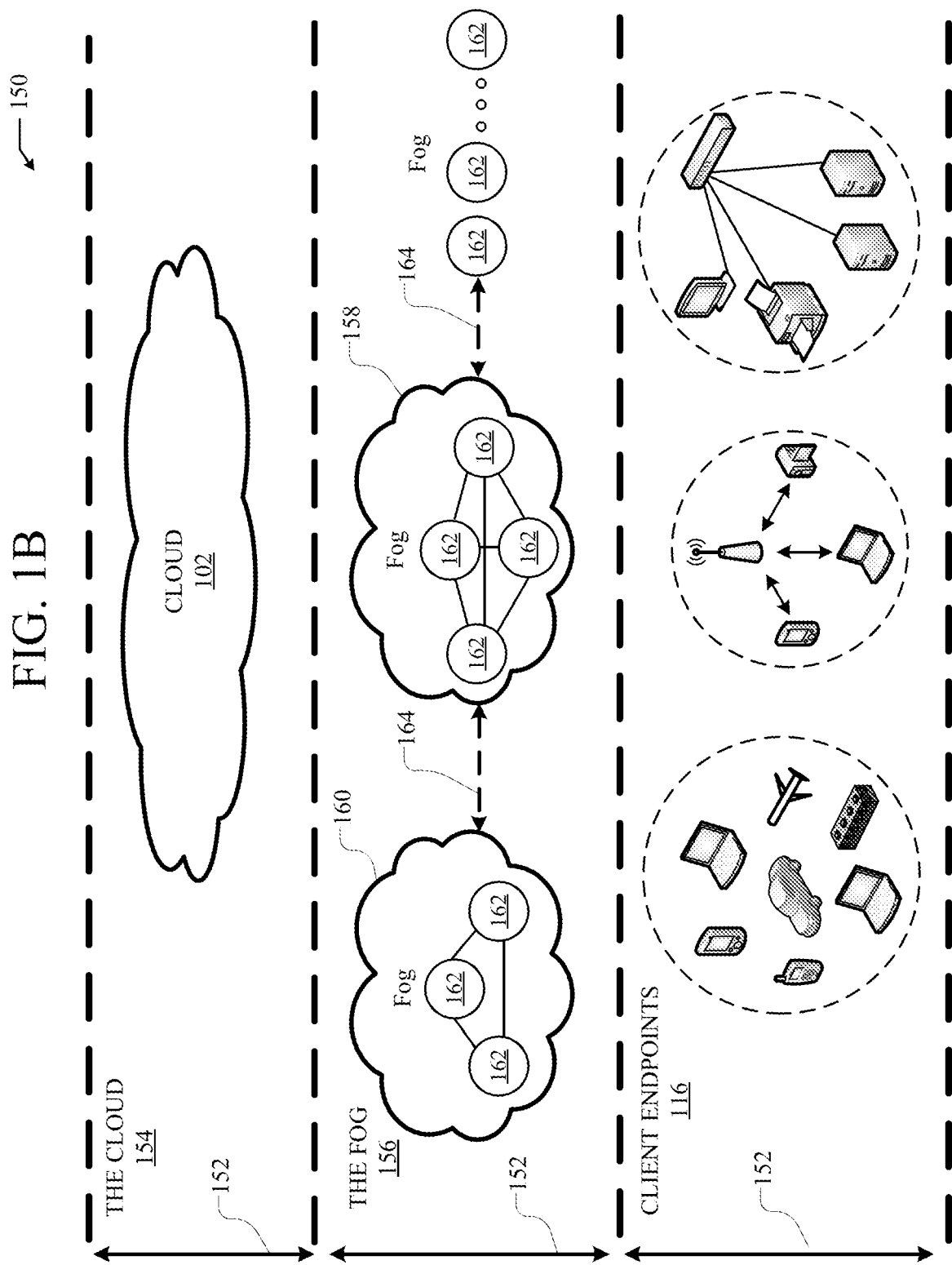
FIG. 1B illustrates an example fog computing architecture.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2:
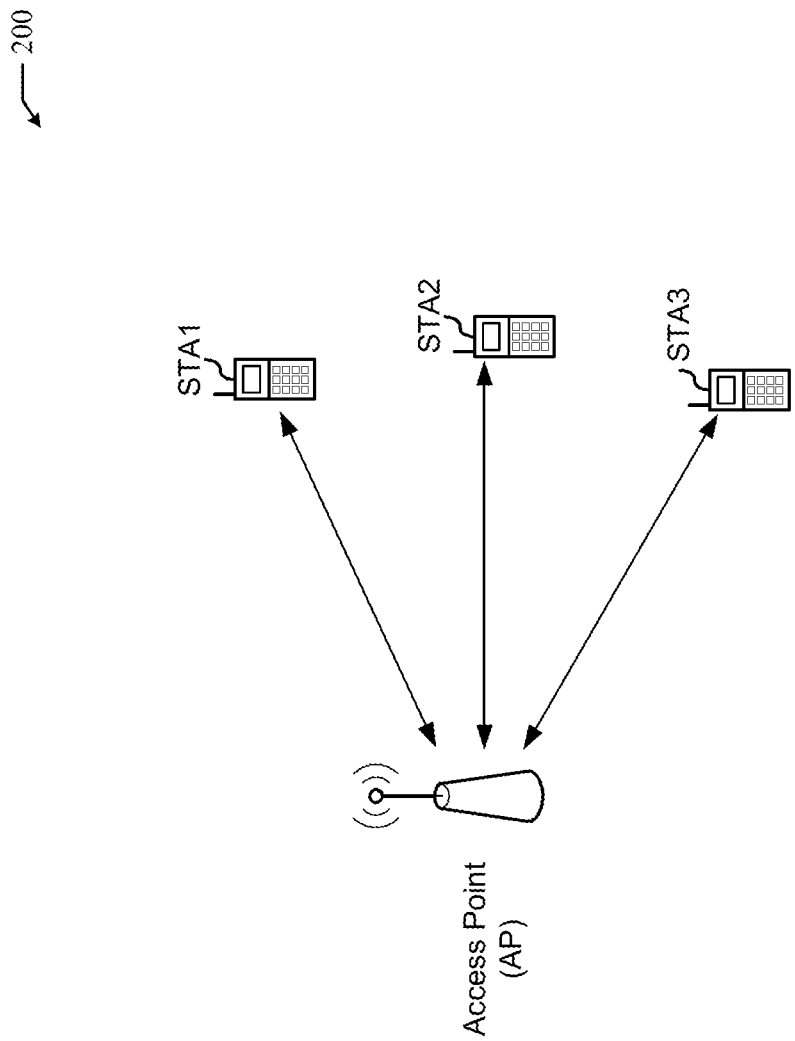
FIG. 2 illustrates an example wireless communication network.

FIG. 2 illustrates an example wireless communication network 200 in which some aspects of the technology can be implemented. The wireless communication network 200 can form an enterprise wireless network. In turn, the systems and techniques described herein can be utilized in controlling link selection and aggregation across the wireless communication network 200 and another network.

The wireless communication network 200 includes an Access Point (AP), configured for wireless communication with multiple receivers or client devices (e.g., STA1, STA2, and STA3). It is understood that additional (or fewer) STAs and/or APs could be implemented in network 200, without departing from the scope of the technology. The STAs and AP shown in FIG. 2 can be configured to form a WiFi network. A WiFi network, as used herein, is a network that is formed in maintained in accordance with the Institute of Electrical and Electronics Engineers (IEEE) 802.11 family of standards. Specifically, the AP and the STAs can wirelessly communicate with each other according to the IEEE 802.11 family of standards to form a WiFi network.

The AP may have access or interface to a Distribution System (DS) or another type of wired/wireless network that may carry traffic in and out of a basic service set (BSS) (not illustrated). Thus traffic to STAs can originate from outside the BSS, and arrive through the AP for delivery to the STAs. Conversely, traffic originating from STAs to destinations outside the BSS can be sent to the AP to be delivered to the respective destinations. Traffic between STAs within the BSS can be sent through the AP where the source STA may send traffic to the AP and the AP may deliver the traffic to the destination STA. The traffic between STAs within a BSS may be peer-to-peer traffic.

Using the IEEE 802.11 infrastructure mode of operation, the AP can transmit on a fixed channel, for example that is 20 MHz wide, and designated as the operating channel of the BSS. This channel may also be used by the STAs to establish a connection with the AP. The channel access in an IEEE 802.11 system may be Carrier Sense Multiple Access with Collision Avoidance (CSMA/CA). In this mode of operation, the STAs, including the AP, can sense the primary channel. If the channel is detected to be busy, the STA may back off. If the channel is detected to be free, the STA may acquire the channel and transmit data. Alternatively, the AP can implement an applicable form of direct scheduling, e.g. Orthogonal Frequency Division Multiple Access (OFDMA) scheduling, to control contention and collision avoidance between the STAs.

It is understood that network 200 can implement various wireless standards using different channel sizes (bandwidths), without departing from the technology. By way of example, IEEE 802.11n, High Throughput (HT) STAs may be used, e.g., implementing a 40 MHz communication channel. This can be achieved, for example, by combining a primary 20 MHz channel, with an adjacent 20 MHz channel to form a 40 MHz wide contiguous channel. In IEEE 802.11a/c, very high throughput (VHT) STAs can also be supported, e.g., 20 MHz, 40 MHz, 80 MHz, and/or 160 MHz wide channels. The 40 MHz, and 80 MHz, channels can be formed, e.g., by combining contiguous 20 MHz channels. A 160 MHz channel may be formed, for example, by combining eight contiguous 20 MHz channels, or by combining two non-contiguous 80 MHz channels (e.g., referred to as an 80+80 configuration).

Figure 3:
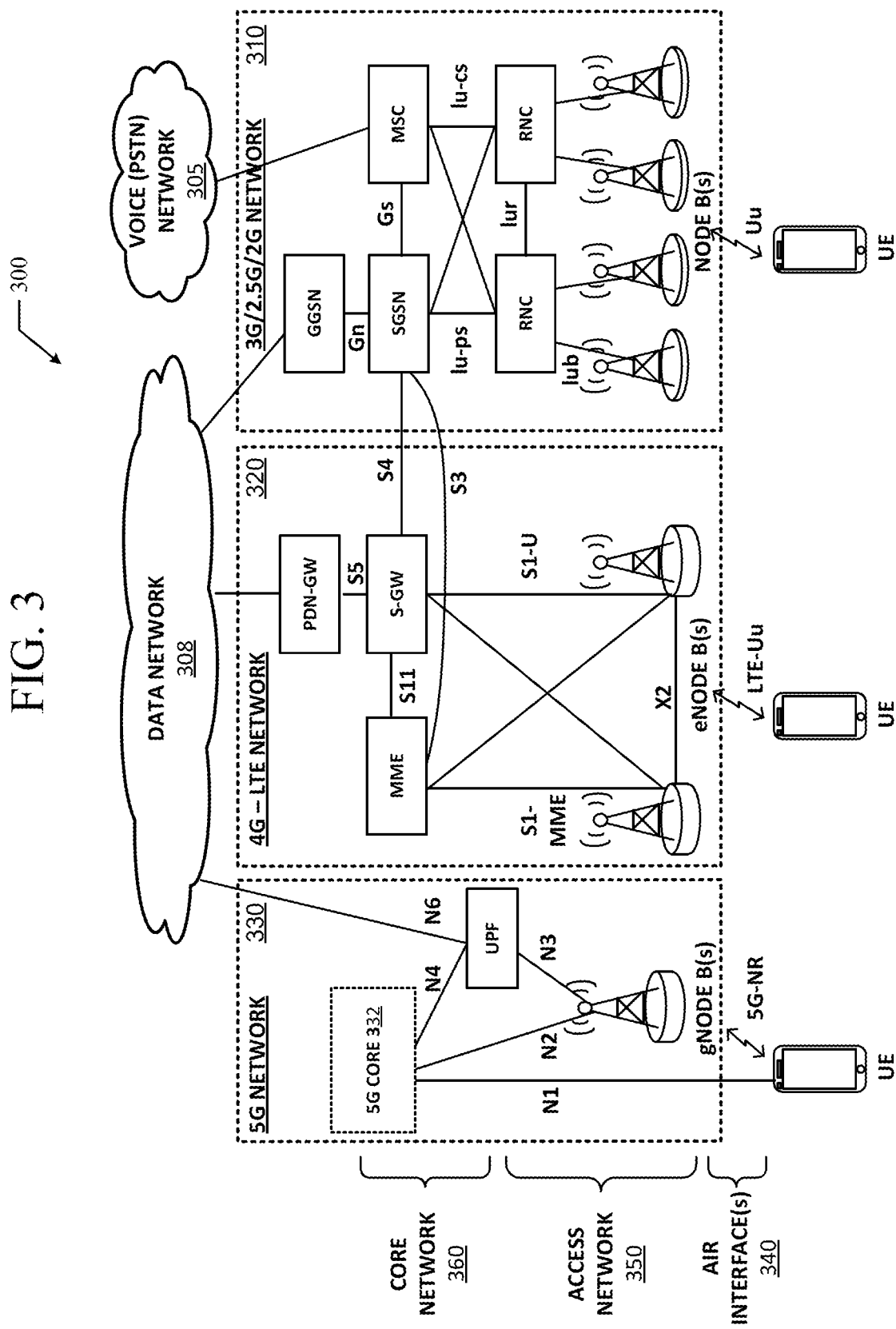
FIG. 3 illustrates a schematic block diagram of example telecommunication networks.

FIG. 3 illustrates a schematic block diagram of example telecommunication networks 300, including a 3G network 310, a 4G network 320, and 5G network 330. Telecommunication networks 300 include wireless network interfaces or communication links, such as air interfaces 340, an access network 350, which represents radio infrastructure or radio towers, and a core network 360, which represents respective core network entities, network modules, or Network Functions (NF(s)). The wireless network interfaces or air interfaces 340 include Uu links for 3G network 310, LTE-Uu links for 4G network 320, and 5G-NR links for 5G network 330. In addition, other network interfaces (e.g., Nx, Sx, Lu-x, Gx, etc.) generally interconnect certain nodes (e.g., UE and/or core network entities) with other nodes (e.g., other UE and/or core network entities) based on, for example, distance, signal strength, network topology, current operational status, location, etc. As is appreciated by those skilled in the art, the network interfaces are vehicles for exchanging data packets (e.g., traffic and/or messages) between the nodes using predefined network protocols such as known wired protocols as appropriate. In this context, a protocol consists of a set of rules defining how the nodes interact with each other.

Those skilled in the art will understand that any number of nodes, devices, communication links, and the like may be used, and that the view shown herein is for simplicity. In particular, the representations of telecommunication networks 300, including respective interconnected network entities, are illustrated and described herein for purposes of discussion, not limitation, and it is appreciated that the illustrated networks can include (or exclude) any number of network entities, communication links, and the like, and can support inter-network operability and compatibility.

Access network 350 represents the infrastructure or radio towers, such as a Radio Access Network (RAN), for receiving and transmitting data packets between end user nodes (UE) as well as the various network entities (e.g., core network entities). Access network 350 includes NodeBs (NBs) for 3G network 310, eNodeBs (eNBs) for 4G network 320, and gNodeBs (gNBs) for 5G network 330. The infrastructure for each network may support different functionality and it is appreciated that infrastructure illustrated within one network can include appropriate hardware/software to support functionality of other telecommunication networks.

Respective network entities that form core network 360 (within the telecommunication networks 300) operatively connect respective RAN infrastructure (NBs, eNBs, gNBs) to third party networks such as a voice network 305 (e.g., a Public Switched Telephone Network (PSTN) network) and/or a data network 308 to create end-to-end connections. Prior to 3G (e.g., 2G, 2.5G, etc.) the third party network primarily included a voice network/PSTN 305 (e.g., a circuit switched network). From 3G onward, the third party network transitioned to include a public network (e.g., the Internet), represented by data network 308 (e.g., a packet switched network). Core network 360 and its respective network entities collectively operate to manage connections, bandwidth, and mobility for respective UE.

Notably, core network 360 evolved along three functional planes, including service management, session management, and mobility management. Service management for 2G and 3G networks includes operations to create an Integrated Services Digital Network (ISDN) over wireless links (e.g., Uu links). Session management for 3G and 4G networks generally include operations establish, maintain, and release network resources (e.g., data connections). In particular, in 3G network 310, session management includes a standalone General Packet Radio Service (GPRS) network, while 4G network 320 introduced a fully integrated data only network optimized for mobile broadband (where basic telephone operations are supported as one profile). Mobility management generally includes operations that support movement of UE in a mobile network, such as system registration, location tracking and handover (e.g., often optimized reduce heavy signaling loads). For example, in the context of 4G network 320, a Serving Gateway (SGW) and a Packet Data Gateway (PGW) support session management operations while mobility management operations (which maintains data sessions for mobile UE) are centralized within a Mobility Management Entity (MME).

5G network 330 introduces a new service base architecture (SBA) 332, which generally redistributes functionality of 4G network entities into smaller service-based functions/network entities. In addition, packet routing and forwarding functions (which are performed by SGW and PGW in 4G network 320) are realized as services rendered through a new network function/entity called the User Plane Function (UPF). In this fashion, 5G network 330 provides a modular set of services that support dynamic and scalable deployment of resources to satisfy diverse user demands.

As discussed previously, current mobile devices typically support at least two wireless interfaces to different wireless networks. For example, current mobile devices typically have a wireless interface to a cellular network, e.g. LTE network, and a wireless interface to an enterprise wireless network, e.g. WiFi network. In turn, the mobile devices can access network services through either or both of the cellular network and the enterprise wireless network using the corresponding network interfaces. However, providing capabilities to access network services through multiple networks can create problems with respect to link selection and aggregation across the networks.

Specifically and as discussed previously, as cellular networks and enterprise wireless networks are typically maintained by separate entities, problems with respect to link selection and aggregation across the networks can arise. In particular, operators of different wireless networks can implement conflicting techniques for performing link selection and aggregation across the networks. For example, cellular operators have attempted to deploy 3GPP's HetNet approaches to control link selection and aggregation. In HetNet approaches, enterprise wireless network link selection and aggregation is controlled by a cellular operator via ANDSF. However, this policy is not congruent with the policies of enterprise wireless network/WiFi operators who typically prefer to provide wireless network service access through the enterprise network because of the enhanced security it provides. Specifically, HetNet approaches treat both WiFi networks and cellular networks as equally viable, e.g. using radio-level KPIs to ultimately select the network, in contrast to the policies of WiFi operators which may, prefer WiFi as the network of choice. On the enterprise network side, MBO has been proposed as a way for a mobile device to advertise its cellular modem availability for cellular network access. However, MBO does not address the link selection process across both cellular and WiFi networks, e.g. no preference is presumed between the networks.

Further and as discussed previously, providing separate interfaces to a plurality of wireless networks can increase both power demands at mobile devices and resource usage, e.g. air-time usage, by the mobile devices across the networks. Specifically, HetNet, MBO, and most other arbitration and load-balancing techniques require that both interfaces be in an operational state, thereby consuming large amounts of power & air-time. In particular, HetNet requires that both WiFi network and cellular network control capabilities, and corresponding network interfaces, are activated to estimate access quality for purposes of either switching between the active interfaces or using both of the interfaces to access network services. However, this increases power consumption at the mobile devices and resource, e.g. air-time, usage by the mobile devices.

The present includes systems, methods, and computer-readable media for solving these problems/discrepancies. Specifically, the present technology involves system, methods, and computer-readable media for controlling link selection and aggregation across multiple wireless networks based on a location of a mobile device. Additionally, the present technology involves systems, methods, and computer-readable media for selectively toggling network interfaces on a mobile device to control link selection and aggregation across multiple wireless networks based on a location of the mobile device.

FIG. 4 illustrates an example network environment 400 for controlling link selection and aggregation across multiple wireless networks based on mobile device location. The network environment 400 shown in FIG. 4 includes a first wireless network 402, a second wireless network 404, and a mobile device 406.

Both the first wireless network 402 and the second wireless network 404 can be an applicable network for wirelessly providing network services to one or more mobile devices. Specifically, the first wireless network 402 can be an applicable enterprise wireless network, such as the wireless communication network 200 show in FIG. 2, and the second wireless network 404 can be an applicable cellular network, such as one of the telecommunication networks 300 show in FIG. 3. For example, the first wireless network 402 can be a WiFi network and the second wireless network 404 can be an LTE network. While reference is made herein to a WiFi network and an LTE network, the first wireless network 402 and the second wireless network 404 can be formed as part of applicable wireless networks. For example, either or both the first wireless network 402 and the second wireless network 404 can be a Citizens Broadband Radio Service (CBRS) network, a 5G network, a Wireless Smart Utility Network (Wi-SUN), a LoRaWAN, ISA100, wirelessHart, or an applicable IoT device wireless network. Further, both the first wireless network 402 and the second wireless network 404 can be the same type of wireless network. For example, the first wireless network 402 can be a first WiFi network and the second wireless network 404 can be a second WiFi network.

The first wireless network 402 and the second wireless network 404 can provide network service access to one or more mobile devices within a specific physical location. In particular, at least a portion of a physical location can be in wireless range of the first wireless network 402 and mobile devices at the physical location that are in wireless range of the first wireless network 402 can access network services through the first wireless network 402. Similarly, at least a portion of the physical location can be in wireless range of the second wireless network 404 and mobile devices at the physical location that are in wireless range of the second wireless network 404 can access network services through the second wireless network 404. Both the first wireless network 402 and the second wireless network 404 can provide overlapping wireless coverage in at least a portion of a physical environment. For example, a physical environment can include a campus building and the first wireless network 402 can be a WiFi network established in and around the building and the second wireless network 404 can be an LTE network. As follows, the WiFi network can provide wireless coverage inside the building and the LTE network can provide wireless coverage outside of the building. Further, the WiFi network and the LTE network can provide overlapping wireless coverage in regions outside of the building and regions inside of the building, e.g. in what will be described in greater detail later as transitional zones. For example, the WiFi network and the LTE network can provide overlapping wireless coverage in a lobby of the building, and the area immediately outside the lobby, that effectively serves as a transitional zone between the WiFi network and the LTE network.

The mobile device 406 can be wirelessly coupled to either or both the first wireless network 402 and the second wireless network 404 to access network services. Specifically, the mobile device 406, as with most current user equipment, can have a first wireless interface to the first wireless network 402 and a second wireless interface to the second wireless network 404. As follows, the mobile device 406 can access network services through the first wireless network 402 using the first wireless interface to the first wireless network 402. Further, the mobile device 406 can access network services through the second wireless network 404 using the second wireless interface to the second wireless network 404.

The location based network access system 408 functions to control access of the mobile device 406 to either or both the first wireless network 402 and the second wireless network 404. In controlling access to the first wireless network 402 and the second wireless network 404, the location based network access system 408 can perform link selection and link aggregation across the first wireless network 402 and the second wireless network 404. For example, the location based network access system 408 can control the mobile device 406 to access network services through the first wireless network 402 and not the second wireless network 404. Alternatively, the location based network access system 408 can control the mobile device 406 to access network services through the second wireless network 404 and not the first wireless network 402. Further, the location based network access system 408 can control the mobile device 406 to access network services through both the first wireless network 402 and the second wireless network 404, e.g. simultaneously.

In controlling access of the mobile device 406 to either or both the first wireless network 402 and the second wireless network 404, the location based network access system 408 can selectively operate wireless network interfaces at the mobile device 406. Specifically, the location based network access system 408 can selectively toggle the first and second wireless interfaces at the mobile device 406 to control access to either or both the first wireless network 402 and the second wireless network 404. Selectively toggling can include activating a wireless interface from a disabled state to allow access to a wireless network through the wireless interface. For example, the location based network access system 408 can activate the first wireless interface to allow the mobile device 406 to access network services through the first wireless network 402 using the first wireless interface. Further, selectively toggling can include disabling a wireless interface from an active state to a disabled state to prevent access to a wireless network through the disabled network interface. For example, the location based network access system 408 can disable to second wireless interface to prevent the mobile device 406 from accessing network services through the second wireless network 404 using the second wireless interface. Additionally, selectively toggling can include leaving a wireless interface in either an active state or a disabled state to facilitate access to a network or prevent access to the network. For example, the location based network access system 408 can leave both the first and second wireless interfaces in an activated state to allow the mobile device to access network services through either or both the first wireless network 402 and the second wireless network 404.

The location based network access system 408 can be implemented, at least in part, at the mobile device 406. For example, the mobile device 406 can locally determine whether to access network services through either or both the first wireless network 402 and the second wireless network 404. Further, the location based network access system 408 can be implemented, at least in part, remote from the mobile device 406, e.g. in a cloud environment or in a network infrastructure of the first wireless network 402 and/or a network infrastructure of the second wireless network 404. When the location based network access system 408 is implemented remote from the mobile 406, it can remotely determine whether the mobile device 406 should aggregate network service access across both the first wireless network 402 and the second wireless network 404. Further, the location based network access system 408 can be implemented both at the mobile device 406 and remote from the mobile device 406. For example, the location based network access system 408 can remotely determine that the mobile device 406 should only access network services through the first wireless network 402. As follows, the location based network access system 408 can locally activate the first wireless interface and locally disable the second wireless interface at the mobile device 406 to facilitate network service access through only the first wireless network 402.

By selectively toggling wireless interfaces at the mobile device 406 to control wireless network access, the location based network access system 408 can control link selection and aggregation at the mobile device 406 across the first and second wireless networks 402 and 404. For example, the location based network access system 408 can perform link aggregation across the first and second wireless networks 402 and 404 by activating the wireless interfaces at the mobile device 406 to the first and second wireless networks 402 and 404. In another example, the location based network access system 408 can perform link selection across the first and second wireless networks 402 and 404 by selectively enabling and disabling the corresponding wireless interfaces at the mobile device 406 to the first and second wireless networks 402 and 404. This can solve the previously described deficiencies with respect to power and resource usage of current mobile devices accessing network services through multiple wireless networks. For example, disabling a wireless interface to limit access to one of the first wireless network 402 and the second wireless network 404 can decrease power consumption and resource usage by the mobile device 406. Further this can solve the previously described deficiencies with respect to inconsistencies between access policies of cellular operators and enterprise network operators.

The location based network access system 408 can determine whether the mobile device 406 should access network services through either or both the first wireless network 402 and the second wireless network 404 based on a location of the mobile device 406 in a physical environment. As follows, the location based network access system 408 can selectively toggle the wireless interfaces at the mobile device 406 based on whether it is determined to access network services through either or both the first wireless network 402 and the second wireless network 404. For example, and as will be discussed in greater detail later, if the mobile device 406 is inside of a building, then the location based network access system 408 can determine that the mobile device 406 should access network services through a WiFi network. Further in the example, the mobile device 406 can still detect a cellular signal while the mobile device 406 is inside. Regardless of the mobile device 406 being in range of a cellular network, the location based network access system 408 can activate or ensure that a WiFi interface at the mobile device 406 is active and deactivate a cellular network interface at the mobile device 406. In another example, if the mobile device 406 is outside of the building, then the location based network access system 408 can determine that the mobile device 406 should access network services through the cellular network. Further in the example, the mobile device 406 can still detect a WiFi signal while the mobile device 406 is outside. Regardless of the mobile device 406 being in range of the WiFi network, the location based network access system 408 can activate or ensure that the cellular interface at the mobile device 406 is active and deactivate the WiFi interface at the mobile device 406.

The location based network access system 408 can use applicable systems and/or an applicable technique to identify a location of the mobile device 406 in the physical environment. Systems and techniques using in identifying a location of the mobile device 406 can depend on characteristics of the actual location of the mobile device. For example, the Global Positioning System can be used to identify the location of the mobile device 406 when the mobile device 406 is outdoors or in unshieled indoor areas. In another example, a WiFi-based positioning technique, e.g. WiFi HyperLocation, can be used to identify the location of the mobile device 406 when the mobile device 406 is indoors or outdoors in a transition area between the WiFi network and a cellular network. In another example, signal characteristics, e.g. radio frequency characteristics, and basic service set identifier (BSSID) geometry can be used to identify the location of the mobile device 406 when the mobile device 406 is indoors or otherwise in range of the WiFi network. Specifically, a received signal strength of a signal received at an access point from the mobile device 406 and a known location of the access point can be used to identify a location of the mobile device 406. While specific examples are discussed with respect to identifying a location of the mobile device 406, applicable lateration techniques and/or time of flight (ToF) techniques can be used in identifying the location of the mobile device 406. Such techniques can use IEEE 802.11 family of standards messaging or other techniques, e.g. based on a previously known location of the mobile device 406, application of Ultra Wideband (UWB) ToF exchanges, to identify the location of the mobile device 406. Similarly, beacons of various types, such as Bluetooth beacons, that broadcast their location over a small area can be used to identify the location of the mobile device.

In controlling network service access of the mobile device 406 based on the physical location/space occupied by the mobile device 406, the location based network access system 408 can control network service access based on characteristics of providing network service access to mobile devices at or within proximity to the location in the physical environment. Specifically, the location based network access system 408 can determine whether the mobile device 406 should access network services through either or both the first and second wireless networks 402 and 404 based on characteristics of providing network service access through the networks 402 and 404 to mobile devices at or within proximity to the location occupied by the mobile device 406. Characteristics of providing network service access to mobile devices at or in proximity to a location can include applicable characteristics related to network service access through either or both the first wireless network 402 and the second wireless network 404 at or in proximity to the location. For example, the characteristics can include mobility characteristics of the mobile devices accessing network services through either or both the first wireless network 402 and the second wireless network 404 at or in proximity to the physical location, one or more dwell times of the mobile devices accessing the network services through either or both the first wireless network 402 and the second wireless network 404 at or in proximity to the physical location, latencies associated with the mobile devices accessing the network services through either or both the first wireless network 402 and the second wireless network 404 at or in proximity to the physical location, device density of the mobile devices accessing the network services through either or both the first wireless network 402 and the second wireless network 404 at or in proximity to the physical location, and wireless coverage levels of either or both the first wireless network 402 and the second wireless network 404 at or in proximity to the physical location.

The location based network access system 408 can characterize physical locations within the physical environment for purposes of controlling network access to mobile devices at or in proximity to the physical locations. Specifically, the location based network access system 408 can characterize physical locations within the physical environment based on characteristics of providing network service access at or in proximity to the physical locations through either or both the first wireless network 402 and the second wireless network 404. More specifically, the location based network access system 408 can characterize a location based on the previously described characterizations of network service provisioning. For example, if a physical location is within a building in a low traffic area and a WiFi network is associated with low latency at the location, then the location based network access system 408 can characterize the location as a location that is best served through the WiFi network in the building.

The location based network access system 408 can characterize physical locations into different zones within the physical environment. Specifically, the location based network access system 408 can characterize physical locations into different zones based on characteristics, such as the previously described characteristics, of wirelessly providing network service access to mobile devices at the physical locations. A zone, as used herein, is a physical space within the physical environment. For example, the location based network access system 408 can characterize locations in a courtyard of a building into a first zone, e.g. a transitional zone, based on mobile devices in the courtyard having high mobility and short dwell times. Further in the example, the location based network access system 408 can characterize locations in office cubicles of the building into a second zone based on mobile devices at the cubicles having low mobility and long dwell times. The location based network access system 408 can characterize physical locations into different zones based on characteristics of providing network services access through either or both the first wireless network 402 and the second wireless network 404 to mobile devices at the physical locations. For example, and as will be discussed in greater detail later, the location based network access system 408 can characterize a physical location as being in a transitional zone when both the first wireless network 402 and the second wireless network 404 provide overlapping wireless coverage at the physical location and high device mobility exists at the location.

Zones within a physical environment can change. Specifically, physically locations that are classified into a zone can subsequently be reclassified or otherwise characterized into a different zone, e.g. as part of dynamic zone classification. For example, a region around a window in a building can first be classified into a transitional zone and subsequently be classified into a work zone. Further in the example, the region around the window can be reclassified back into the transitional zone from the work zone. Locations can be classified and reclassified into different zones based on changing RF coverage at the locations, e.g. due to applicable conditions affecting RF coverage. Specifically, as RF coverage is transient, a specific zone that a physical location is classified into can change as the RF coverage changes at the physical location.

The classification of a zone can also vary over time based on usage of that zone, e.g., density of devices and amount of traffic, as well as changing RF characteristics, e.g., when metal doors may be opened or closed. Accordingly, physical locations can be dynamically classified into different zones, e.g. based on changing usage of the zone. For example, as more devices access network services in a lobby of a building change throughout the work day, the lobby can be dynamically classified into different zoens through the work day. Note that some of these changes may be periodic and predictable, e.g., high-density usage may occur every work day from 8 AM to 5 PM, and hence the classification can be predicted as a function of day/time. In other cases, the changes may not be predictable in advance, but may be measured in real-time leading to changes in classification.

The physical environment can include a plurality of separate zones that are each geographically distinct from each other. For example, the physical environment can include a work zone that is geographically separate from a transitional zone. A transitional zone can be a physical space in the physical environment, with overlapping wireless coverage by both the first wireless network 402 and the second wireless network 404. Further, a transitional zone can include one or more locations that are characterized by high device mobility, low dwell times, high latency, high RF disruption levels, and potentially high user/mobile device density, e.g. when compared to other regions in the physical environment. A work zone can be a physical space in the physical environment that might include overlapping wireless coverage between wireless networks 402 and 404, however, providing network service access through one of the wireless networks 402 and 404 is infeasible or otherwise impractical. Further, a work zone can include one or more locations that are characterized by low device mobility, high dwell times, low latency, low RF disruption levels, and potentially low user/mobile device density, e.g. when compared to other regions in the physical environment.

Based on the characterization of the locations in the physical environment, the location based network access system 408 can define one or more wireless network selection policies for controlling access to mobile devices at or in proximity to the locations. A wireless network selection policy can specify which wireless network(s) a mobile device should access network services through based on a location of the mobile device. For example, a wireless network selection policy can specify that when a mobile device is inside of a building, the mobile device should only access network services through an enterprise wireless network. In another example, a wireless network selection policy can specify that when a mobile device is outside of a building, the mobile device should only access network services through a cellular network. In yet another example, a wireless network selection policy can specify that when a mobile device is in a transitional zone, e.g. in a reception area at a building entrance, then the mobile device should access network services through either or both a cellular network and an enterprise wireless network. A wireless network selection policy can be configured to trigger activation of one or more links in an alternate wireless network. For example, a wireless network selection policy can be configured to trigger a mobile device to switch from accessing network services through a cellular network to accessing network services through a WiFi network when the mobile device moves indoors.

The location based network access system 408 can define one or more wireless network selection policies based on zones that the physical locations are classified into according to characteristics of providing network service access. Specifically, the wireless network selection policies can specify whether the mobile device 406 should connect to either or both the first wireless network 402 and the second wireless network 404 based on corresponding zones of locations in the physical environment. For example, a wireless network selection policy can specify that the mobile device 406 should access network services through both the first wireless network 402 and the second wireless network 404 when the mobile device 406 is in a transitional zone. Further in the example, the wireless network selection policy can specify that the mobile device 406 should access network services through the second wireless network 404, e.g. a cellular network, when the mobile device 406 is in a zone that is separate from a transitional zone and outside of a building.

The location based network access system 408 can selectively toggle the wireless interfaces at the mobile device 406 based on one or more applied network selection policies. Specifically, the location based network access system 408 can control the mobile device's 406 access to network services based on the one or more applied network selection policies by selectively toggling the wireless interfaces at the mobile device 406 according to the network selection policies. For example, a network selection policy can specify that when the mobile device 406 is at an office space location, then the mobile device 406 should only access network services through the first wireless network 402, e.g. a WiFi network. In turn, the location based network access system 408 can activate the wireless interface to the first wireless network 402 and disable the wireless interface to the second wireless network 404 when the mobile device 406 is at the office space location. In another example, a wireless network selection policy can specify that when the mobile device 406 is in a transitional zone, such as a building entrance, then the mobile device 406 should be configured to access network services through either or both the first wireless network 402 and the second wireless network 404. As follows, the location based network access system 408 can ensure that the wireless interfaces to both the first and second wireless networks 402 and 404, e.g. a WiFi network and a cellular network, are activated when the mobile device 406 is at the building entrance.

Locations in the physical environment can be manually classified into different zones. Specifically, a network administrator can manually classify the locations into zones within the physical environment. For example, an administrator can manually define spaces in a building as work zones. Further in the example, the spaces that are not characterized as work zones can automatically be classified as transitional zones within the building. In turn, wireless network selection policies can be defined and applied based on the manual classification of the locations into the different zones.

Further, locations can be classified by the location based network access system 408 into zones within the physical environment using a plan of at least a portion of the physical environment. Specifically, the location based network access system 408 can semi-automatically classify locations into zones within the physical environment using one or more radio frequency (RF) proximity maps. An RF proximity map can include applicable data related to providing network service access through one or more wireless networks to mobile devices at specific locations within the physical environment. For example, an RF proximity map can include wireless signal coverages at locations, dwell times of devices at the locations, densities of mobile devices at the locations, amounts of latency associated with accessing network services at the locations, access point locations in the physical environment, amounts of mobile device roaming, and wireless paths, e.g. access point paths, in the physical environment. In using an RF proximity map to classify locations into zones, the location based network access system 408 can identify convex hulls within the physical environment where seamless transition in the first wireless network 402, e.g. a wireless enterprise network, is expected. The location based network access system 408 can label such hulls as work zones and the regions between the hulls as transitional zones.

The location based network access system 408 can use an applicable technique for generating and maintaining RF proximity maps for the physical environment. For example, the location based network access system 408 can use Neighbor Discovery Protocol (NDP) messaging to create RF proximity maps for the physical environment.

Further, the location based network access system 408 can use an applicable analysis technique, e.g. an applicable machine learning or artificial intelligence technique, to classify locations into zones within the physical environment. Specifically, using machine learning, the location based network access system 408 can classify locations where the probability p of maintaining an enterprise wireless network signal is above a threshold i into specific zones, e.g. work zones. Further, using machine learning, the location based network access system 408 can classify locations where the probability p of maintaining the enterprise wireless network signal drops below the threshold i, or where disconnections are observed, into other zones, e.g. transitional zones. A similar threshold technique can be applied in classifying locations based on other applicable metrics. For example, a location can be classified based on a probability p of maintaining exchanges within a latency threshold i, a throughput threshold i, or another applicable threshold metric for wirelessly accessing network services.

Additionally, the location based network access system 408 can classify locations into zones within the physical environment based on mobile device responses in accessing network services from the locations. Specifically, the location based network access system 408 can classify locations into zones based on mobile device responses to BSS transmission management (BTM) messages, e.g. messages to force roaming. These responses can be indicative of zone boundaries, e.g. work zone boundaries. For example, a mobile device ignoring access point suggestions can be indicative of a zone boundary. Further, these responses can be indicative of the need to refine the geometry of a zone, e.g. a work zone. For example, a client roaming from a first access point to a second access point when the second access point is not measured as an RF neighbor to the first access point can be indicative of a need to refine the geometry of a zone including either or both the first access point and the second access point. Further, a mobile device switching from WiFi to a cellular network can signal convex hull discontinuity, corresponding to one or more zones.

The location based network access system 408 can be implemented in a network infrastructure, e.g. of the wireless network 402 and/or the second wireless network 404, and centrally characterize the locations in providing network service access. Specifically, the location based network access system 408 can centrally classify the locations into zones within the physical environment based on network service access characteristics. In turn, the location based network access system 408 can centrally define one or more wireless network selection policies for controlling mobile device access to network services through either or both the first wireless network 402 and the second wireless network 404.

In centrally characterizing locations, the location based network access system 408 can determine WiFi radios at the edge of a space, e.g. edge of a building, where coverage is marginal. For example, if stations disconnect from an access point before connecting to another access point, then the location based network access system 408 can centrally determine that a corresponding location has marginal coverage. In another example, if transition signals between access points are below a particular threshold, then the location based network access system 408 can centrally determine that a corresponding location has marginal coverage. In turn, the location based network access system 408 can define the boundary of a zone, e.g. a work zone, where the WiFi coverage is marginal. The location based network access system 408 can centrally characterize locations based on identified locations of mobile devices in the physical environment. For example, the location based network access system 408 can use a known location of a mobile device, e.g. through received signal strength indicator (RSSI) triangulation, to characterize the location in providing network service access to the mobile device.

When the one or more wireless network selection policies are generated remote from the location based network access system 408, e.g. centrally in a network infrastructure, the defined policies can be distributed in an applicable manner. Specifically, the wireless network selection policies can be distributed through either or both the first wireless network 402, e.g. WiFi network, and the second wireless network 404, e.g. LTE network. Further, when the location based network access system 408 is centrally located, it can enforce the policies from the central location. Specifically, the location based network access system 408 can be integrated as part of the network infrastructure and send commands from the infrastructure to the mobile device 406 for controlling the mobile device's 406 access to network services according to a policy. For example, the location based network access system 408 can send an instruction that directs the mobile device 406 to switch to a cellular connection or otherwise analyze potential network service access through the cellular connection. In another example, the location based network access system 408 can send an message, e.g. an LTE compatible S14 message, that triggers activation of an enterprise wireless network interface, e.g. WiFi, interface.

The location based network access system 408 can be implemented at the mobile device 406 and locally characterize, e.g. from the mobile device 406, the locations based on the locations providing network service access. Specifically, the location based network access system 408 can locally classify the locations into zones within the physical environment based on network service access characteristics. In turn, the location based network access system 408 can locally define one or more wireless network selection policies for controlling the mobile device's 406 access to network services through either or both the first wireless network 402 and the second wireless network 404. The locally created policies can then be used to locally toggle interfaces at the mobile device 406 to control the mobile device's 406 access to wireless networks.

In locally characterizing locations, the location based network access system 408 can cache, at the mobile device 406, information related to network service access from various locations in the physical environment. Specifically, as the mobile device 406 moves through the physical environment, the location based network access system 408, implemented at the mobile device 406, can gather characteristics information and store the characteristics information locally at the mobile device 406. More specifically, the location based network access system 408 can store a cache of BSSIDs from which roaming or traffic exhibited threshold, e.g. high, frame retry percentages or specific RF characteristics, e.g. low signals or temporal disconnects. This local generation and storage of characteristics data can be very accurate as mobile devices often move through the same environment multiple times.

Further, in locally characterizing locations, the location based network access system 408 can collect, from the mobile device 406, information about a used link. Specifically, the location based network access system 408 can locally identify latency over a specific link. More specifically, the location based network access system 408 can locally identify latency over a specific link for a specific application. As this information collection occurs over time, the location based network access system 408 can associate paths to latency targets. As follows, the location based network access system 408 can compare paths based on corresponding latency targets. The latency targets of paths and corresponding comparisons between paths can be used by the location based network services access system 408 to characterize locations. For example, if a path at a location does not meet a latency target through WiFi, then the location based network access system 408 can exclude the location from a work zone.

When a wireless network selection policy is locally determined, stored, and/or implemented by the mobile device 406, the mobile device 406 can store and implement a device-implemented version of the policy. Specifically, the policy can specify RF boundaries of zones and corresponding RF signal quality thresholds at the RF boundaries for triggering interface activation and deactivation. For example, the mobile device 406 can store a device-implemented wireless network selection policy that specifies a roam path from a first access point to a second access point. In the example, if a RF signal degrades to −75 dBm, then a switch to another wireless network, e.g. a cellular network, is desired. As follows, the device-implemented selection policy can associate the boundary point of the third access point with both a RSSI degrading to −70 dBm or greater and corresponding movement of the mobile device 406. This association in the device-implemented selection policy can trigger switching of the mobile device 406 to a different network.

The location based network access system 408 can characterize locations based on types of applications executing at mobile devices. For example, the location based network access system 408 can identify network service characteristics of an application over a specific link. In turn, the location based network access system 408 can define wireless network selection policies based on types of applications executing at mobile devices. As follows, the location based network access system 408 can control mobile devices access to wireless networks based on types of applications executing at mobile device. For example, the location based network access system 408 can define a policy that specifies to exclusively use a WiFi network when a streaming application is executing at a mobile device at a specific location. Further in the example, the location based network access system 408 can control a mobile device at the specific location to access network services through the WiFi network when the streaming application is executing at the mobile device.

Further, the location based network access system 408 can define zones, e.g. work zones, based on application types. Specifically, the location based network access system 408 can observed application performance over time and classify the applications based on application type. In turn, network access characteristics associated with the applications, e.g. retry counts, losses, jitter, or any applicable performance metric for the applications, can be used to define the geometry of zones for the different applications. Therefore, a zone can have a geometry that varies across the different applications. For example, a work zone for real-time applications can have a different geometry from the same work zone for open application model (OAM) applications.

As described previously, a wireless network selection policy can be configured to trigger activation of one or more links in an alternate wireless network. When the wireless network selection policy is application specific, the activation trigger can also be application specific. For example, the mobile device 406 can be inactive, and the wireless interface to the second wireless network 404, e.g. LTE network, is not activated at a zone boundary until the user enables the mobile device 406 or otherwise starts a specific application at the mobile device 406. Further in the example, a wireless network selection policy used to control the mobile device 406 can specify that the mobile device 406 should remain in a potentially active state until the wireless interface to the second wireless network 404 is activated. In another example, the mobile device 406 can execute a web browser close to the edge of a first zone. Further in the example, a DNS request generated by executing the web browser can trigger an 'open LTE' command that causes the mobile device to activate a wireless interface to an LTE network serving an adjacent second zone.

Zones can be classified through an applicable machine learning technique. Specifically, data about previous visits to a zone can be used to train a classification engine. The training data may be from prior experience of a given device, or an aggregation of previous experiences of a plurality of devices with respect to a zone. The training may be performed on the device or in the infrastructure. In either case of training, the generated model can be communicated and used either in the device or in the infrastructure to classify zones.

In addition, in some cases the classification may be performed in both the infrastructure and in the device. For example, the infrastructure may send a classification to the device, and the device may use that classification as additional input to perform its own classification. In this manner, the device may benefit from the aggregate data learning available to the infrastructure, coupled with local learning from prior experiences in accessing network services. For example, when an employee goes to work and enters the lobby, the infrastructure may have data about thousands of prior entrances to the lobby from many different people over many months. In addition, the employee's device has information from all the prior times that the device entered the lobby over the prior months. Note that the later information can be especially useful since the characteristics of that specific device (e.g., radios available, radio sensitivity, MIMO capabilities, etc) may be quite different than other devices. On the other hand, the information (e.g., learning) aggregated from the other devices is very useful for areas or motion tracks that the specific device has not previously covered or covered only a limited number of times.

Furthermore, the classification can be a function of the specific application that is used in accessing network services, e.g. that needs to communicate as part of accessing network services. For example, a voice over IP call to someone on the enterprise network may be treated differently from that of a browser's web request or a YouTube® streaming video request. This application driven classification can be determined by human entered policies, or by a machine learning approach that determines based on prior historical data which network is preferable for each application based on various KPIs, including application quality of experience (App QoE).

It should be noted that timeliness of policy delivery is important but not critical as the device can resort to a dual-connected state when one interface fails. Specifically, the mobile device 406 can resort to activating network services through either or both the first wireless network 402 and the second wireless network 404 when one of the wireless network interfaces fails at the mobile device. For example, if the wireless interface to the first wireless network 402 fails, then the mobile device 406 can active the wireless interface to the second wireless network 404. In turn, the mobile device 406 can access network services through the second wireless network 404 until the wireless interface to the first wireless network 402 is fixed, at which point the mobile device 406 can access network services through either or both the first wireless network 402 and the second wireless network 404.

FIG. 5 shows an example of a physical environment 500 with wireless coverage to two wireless networks. In particular, a WiFi network and an LTE network provide wireless coverage to the physical environment 500. While the description of FIG. 5 is made with reference to the WiFi network and the LTE network, an applicable type of enterprise wireless network and an applicable type of cellular network can provide wireless coverage in the physical environment 500.

The physical environment 500 spans a region including an office building and areas outside of the office building. Mobile device access to network services through the two wireless networks within the physical environment 500 can be controlled according to the techniques described herein. Specifically, in applying the techniques described herein, the physical environment 500 can be divided into a first zone 502, a second zone 504, a third zone 506, and a fourth zone 508. The first zone 502 can correspond to a work zone including office space in the building where WiFi coverage is widely available and LTE coverage is marginal. The second zone 504 can correspond to a transitional zone where both WiFi coverage and LTE coverage are present. The second zone 504 can be characterized by high device mobility and potentially high device density. The third zone 506 can correspond to marginal WiFi coverage and widely available LTE coverage. The fourth zone 508 can be a region inside of the building, e.g. a cafeteria, where WiFi coverage is widely available and LTE coverage is marginal.

A wireless network selection policy can be used to control a mobile device's network access through either or both the LTE network and the WiFi network as the mobile device moves through the physical environment 500. Specifically, the policy can trigger activation of links in the LTE network and/or the WiFi network which can enable normal passive/active scanning and paging/access channel registration/updates to occur in order to provide specific KPIs, e.g. signal strength and latency, for a multi-path selection or aggregation process.

In an example of controlling mobile device network access through either or both the WiFi network and the LTE network as a mobile device moves in the physical environment, the mobile device can start off in the first zone 502. In the first zone 502, e.g. the work zone, the mobile device can access network services through the WiFi network. Specifically, the WiFi interface at the mobile device can be activated and the LTE interface at the mobile device can be deactivated to ensure that the mobile device just accesses network services through the WiFi network.

Further in the example, as the mobile device moves away from a desk in the first zone 502 and into the lobby, corresponding to the second zone 504, the mobile device can be configured to access network services through either or both of the WiFi network and the LTE network. Specifically, as the mobile device moves into the transitional zone in the lobby, it can roam to an access point in the lobby and also switch to a dual-link mode where both the LTE interface and the WiFi interface are active at the mobile device. More specifically, the mobile device can recognize the BSSID of the access point in the lobby and proactively switch to the dual-link mode (MPTCP, hICN, or other). As the mobile device exits the building and WiFi becomes marginal, the connection quality is maintained (from the mobile device standpoint) because the LTE link has become active before the WiFi connection became unusable. Specifically, if the mobile device moves into the third zone 506, where WiFi coverage is marginal, the connection quality is maintained because the LTE link was activated before the mobile device moved into the third zone 506.

Further, as the mobile device moves along the side of the building, the mobile device can roam to other access points (e.g. outdoor mesh or access points from within the building). However, the mobile device can still continue to maintain the active LTE link, e.g. according to the wireless network selection policy for either or both the second zone 504 or the third zone 506. Once the mobile device enters the cafeteria, e.g. the fourth zone 508, the mobile device can roam to another access point. The mobile device can recognize the BSSID of the access point in the cafeteria and switch to accessing network services through only the WiFi network, e.g. according to the policy for the fourth zone 508. As the mobile device passes through the second zone 504, e.g. transitional zone, before entering the cafeteria, the WiFi interface of the mobile device can be active before the mobile device enters the cafeteria. In turn, this can allow the mobile device to maintain connection quality as it enters the cafeteria and begins accessing network services exclusively through the WiFi network.

The disclosure now turns to FIGS. 6 and 7, which illustrate example network devices and computing devices, such as switches, routers, load balancers, client devices, and so forth.

FIG. 6 illustrates an example of a network device 600 (e.g., switch, router, network appliance, etc.). The network device 600 can include a master central processing unit (CPU) 602, interfaces 604, and a bus 606 (e.g., a PCI bus). When acting under the control of appropriate software or firmware, the CPU 602 can be responsible for executing packet management, error detection, and/or routing functions. The CPU 602 preferably accomplishes all these functions under the control of software including an operating system and any appropriate applications software. The CPU 602 may include one or more processors 608 such as a processor from the Motorola family of microprocessors or the MIPS family of microprocessors. In an alternative embodiment, the processor 608 can be specially designed hardware for controlling the operations of the network device 600. In an embodiment, a memory 610 (such as non-volatile RAM and/or ROM) can also form part of the CPU 602. However, there are many different ways in which memory could be coupled to the system.

The interfaces 604 can be provided as interface cards (sometimes referred to as line cards). The interfaces 604 can control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 604 may include ports appropriate for communication with the appropriate media. In some cases, the interfaces 604 may also include an independent processor and, in some instances, volatile RAM. The independent processors may control communication intensive tasks such as packet switching, media control, and management. By providing separate processors for the communication intensive tasks, the interfaces 604 may allow the CPU 602 to efficiently perform routing computations, network diagnostics, security functions, and so forth.

Although the system shown in FIG. 6 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 600.

Regardless of the network device's configuration, it may employ one or more memories or memory modules (including the memory 610) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

FIG. 7 illustrates an example of a bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software modules 732, 734, 736 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function. For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   identifying a location of a mobile device in a physical environment;
   in response to the location, configuring a first interface of the mobile device in an active state to access a first wireless network;
   in response to a first change in the location and while still connected to the first wireless network, configuring a second interface of the mobile device in an active state to access a second wireless network;
   in response to a second change in the location and while still connected to the second wireless network, disconnecting the first interface from the first wireless network;
   in response to a third change in the location and while still connected to the second wireless network, configuring the first interface of the mobile device to access either the first wireless network or a third wireless network; and
   in response to a fourth change in the location and while still connected to the first wireless network or the third wireless network, disconnecting the second interface from the second wireless network.

2. The method of claim 1, wherein the first wireless network is a cellular network and the second wireless network is a WiFi network and the cellular network and the WiFi network provide overlapping wireless coverage in at least a portion of the physical environment.

3. The method of claim 1, wherein the first wireless network is a WiFi network and the second wireless network is a cellular network and the cellular network and the WiFi network provide overlapping wireless coverage in at least a portion of the physical environment.

4. The method of claim 1, wherein network access to the mobile device through either the first interface or the second interface is controlled by one or more network selection policies.

5. The method of claim 4, wherein the one or more network selection policies trigger activation or deactivation of the first interface or second interface based on the location of the mobile device and network characteristics.

6. The method of claim 4, further comprising:
   classifying the physical environment into different zones based on characteristics of providing network service access to the mobile devices; and
   defining the one or more network selection policies according to the classifications.

7. The method of claim 1, further comprising:
   determining, via machine learning, a probability of maintaining a connection to the first wireless network; and
   in response to the probability being above a threshold, classifying the location of the mobile device as a work zone.

8. The method of claim 1, further comprising:
   determining, via machine learning, a probability of maintaining a connection to the first wireless network; and
   in response to the probability being below a threshold, classifying the location of the mobile device as a transitional zone.

9. A system comprising:
   one or more processors; and
   at least one computer-readable storage medium having stored therein instructions which, when executed by the one or more processors, cause the one or more processors to:
     identify a location of a mobile device in a physical environment;
     in response to the location, configure a first interface of the mobile device in an active state to access a first wireless network;
     in response to a first change in the location and while still connected to the first wireless network, configure a second interface of the mobile device in an active state to access a second wireless network;
     in response to a second change in the location and while still connected to the second wireless network, disconnect the first interface from the first wireless network;
     in response to a third change in the location and while still connected to the second wireless network, configure the first interface of the mobile device to access either the first wireless network or a third wireless network; and
     in response to a fourth change in the location and while still connected to the first wireless network or the third wireless network, disconnect the second interface from the second wireless network.

10. The system of claim 9, wherein the first wireless network is a cellular network and the second wireless network is a WiFi network and the cellular network and the WiFi network provide overlapping wireless coverage in at least a portion of the physical environment.

11. The system of claim 9, wherein the first wireless network is a WiFi network and the second wireless network is a cellular network and the cellular network and the WiFi network provide overlapping wireless coverage in at least a portion of the physical environment.

12. The system of claim 9, wherein network access to the mobile device through either the first interface or the second interface is controlled by one or more network selection policies.

13. The system of claim 12, wherein the one or more network selection policies trigger activation or deactivation of the first interface or second interface based on the location of the mobile device and network characteristics.

14. The method of claim 12, further comprising instructions which, when executed by the one or more processors, cause the one or more processors to:
classify the physical environment into different zones based on characteristics of providing network service access to the mobile devices; and
define the one or more network selection policies according to the classifications.

15. The system of claim 9, further comprising instructions which, when executed by the one or more processors, cause the one or more processors to:
determine, via machine learning, a probability of maintaining a connection to the first wireless network; and
in response to the probability being above a threshold, classify the location of the mobile device as a work zone.

16. The system of claim 9, further comprising instructions which, when executed by the one or more processors, cause the one or more processors to:
determine, via machine learning, a probability of maintaining a connection to the first wireless network; and
in response to the probability being below a threshold, classify the location of the mobile device as a transitional zone.

17. A non-transitory computer-readable storage medium having stored therein instructions which, when executed by one or more processors, cause the one or more processors to:
identify a location of a mobile device in a physical environment;
in response to the location, configure a first interface of the mobile device in an active state to access a first wireless network;
in response to a first change in the location and while still connected to the first wireless network, configure a second interface of the mobile device in an active state to access a second wireless network;
in response to a second change in the location and while still connected to the second wireless network, disconnect the first interface from the first wireless network;
in response to a third change in the location and while still connected to the second wireless network, configure the first interface of the mobile device to access either the first wireless network or a third wireless network; and
in response to a fourth change in the location and while still connected to the first wireless network or the third wireless network, disconnect the second interface from the second wireless network.

18. The non-transitory computer-readable storage medium of claim 17, wherein the first wireless network is a cellular network and the second wireless network is a WiFi network and the cellular network and the WiFi network provide overlapping wireless coverage in at least a portion of the physical environment.

19. The non-transitory computer-readable storage medium of claim 17, wherein the first wireless network is a WiFi network and the second wireless network is a cellular network and the cellular network and the WiFi network provide overlapping wireless coverage in at least a portion of the physical environment.

20. The non-transitory computer-readable storage medium of claim 17, wherein network access to the mobile device through either the first interface or the second interface is controlled by one or more network selection policies.

* * * * *